Dec. 24, 1957     T. I. PRZYSIECKI     2,817,515

TAPE FEEDER

Filed Jan. 20, 1956

INVENTOR
THEODORE I. PRZYSIECKI

BY Emery Robinson
ATTORNEY

2,817,515
TAPE FEEDER

Theodore I. Przysiecki, Highland Park, Ill., assignor to Teletype Corporation, Chicago, Ill., a corporation of Delaware Application January 20, 1956, Serial No. 560,396

8 Claims. (Cl. 271—2.5)

The present invention pertains to an improvement in printing telegraph apparatus and more particularly to an improved record advancing device therefor.

The perforated tape used in printing telegraph transmitters is often used several times so that it is necessary to feed the tape by some means which will not tear or otherwise disable the feed holes in the tape.

One of the objects of the present invention is to provide a device with which the tape may be advanced without any appreciable wear on the tape.

The feed wheel type of tape advance which is well known in the art involves a rather expensive machining process and a complicated mechanism for operation. Another object of the present invention is to provide a mechanism composed of very simple parts which are operable with a minimum of mechanism.

Still another object of the present invention is to provide a means for advancing the record whereby the forces on the record may be distributed over a plurality of surfaces by having a plurality of pins do the work but to position the pins by other than a spring means so that the disengagement can be accomplished with a minimum of pressure on the record yet without any outside disengaging means.

Further objects and advantages of the present invention will be apparent from the following description when read in conjunction with the drawings wherein.

In the present invention, one or more spacing pins are formed of a magnet material such as steel and positioned in a nonmagnetic pin block which is slidably mounted in a guideway running along the direction of the record movement. A permanent magnet is positioned in the lid of the record feed mechanism so as to attract the feed pin or pins up through the feed holes in the tape. A cam and follower arrangement imparts reciprocal movement to the pin block to advance the tape or other perforated record. The pins are formed as to permit the record to cam the pins out of the holes as the pin block is returned for a subsequent advance of record in the event that the pins are still in the magnetic field at the end of the advancing stroke.

Figure 1:
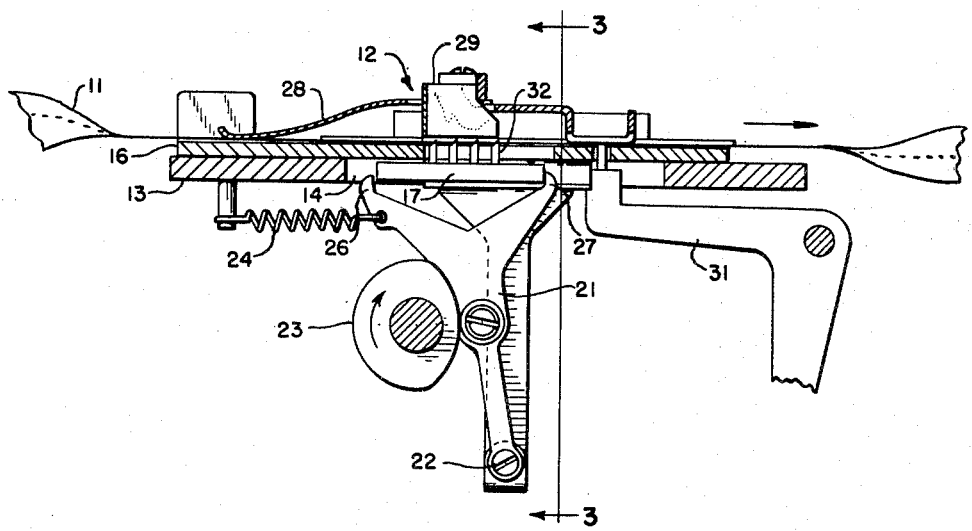
Fig. 1 is an elevation showing the present invention.
Figure 2:
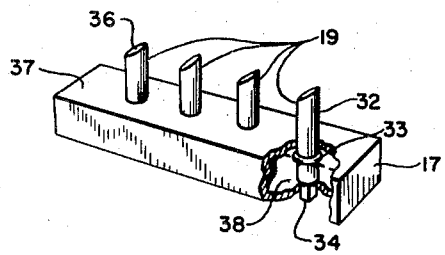
Fig. 2 is an enlarged perspective showing the structure of the spacing pin block.

Referring now to Figs. 1 and 2, a perforated tape 11 having regularly spaced spacing holes therein is shown being advanced from left to right in a tape feeding device 12. The base plate 13 of the tape feed device is suitably mounted on the frame of the tape transmitter and has an aperture 14 therein for purposes to be described. A tape guide 16 mounted over a portion of the aperture 14 in the base plate 13 and is secured to the base plate 13.

Secured to the underside of the tape guide 16 is a guideway 18 formed of two L-shaped members juxtapositioned as to form a substantially U-shaped guideway having a relatively narrow opening running down the center thereof. A rectangular spacing pin block 17 is slidably mounted in the guideway 18 so that its pins 19 protrude into an elongated aperture in the tape guide 16.

An eccentric cam 23 is suitably positioned to be cyclically rotated by the main shaft (not shown) of a tape transmitter or by any other suitable source of power, and has a bifurcated cam follower 21 associated therewith. The cam follower 21 is pivotally mounted on the frame at 22 and urged against the eccentric cam 23 by its spring 24 so as to be oscillated by the cam 23. The cam follower 21 is so positioned that its bifurcations 26 and 27 extend through the opening in the guideway 18 and contact the ends of the pin block 17 so as to impart reciprocal motion to the pin block 17 as the cam follower 21 is oscillated by rotation of the cam 23.

The lid of the tape feed device is designed to be removably fitted over the tape feed for easy access in loading the tape. It may be hinged on one side and latched on the other or it may be positioned in any manner which will assure its alignment with respect to the rest of the tape feed mechanism. The lid consists of a means for tensioning the tape to prevent buckling such as the flat spring 28 which is positioned so that its curved portion is against the bottom of the tape guide 16 and will apply limited pressure to the tape 11 when it is interposed between the spring 28 and the floor of the tape guide 16. A permanent magnet 29 which is exactly the length of the span of the desired number of pins (in the present illustration this is the width of four pins plus the three spaces between them) is secured in nonmagnetic material in the lid so as to be positioned above the elongated aperture in the tape guide floor when the lid is secured in place. To the right of the magnet 29 (in Fig. 1), the lid has the usual openings to permit the sensing means 31 to function in the usual manner.

Figure 4:
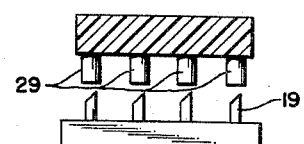
Fig. 4 is an enlarged schematic view of a variation of magnet and pin arrangement.
Figure 3:
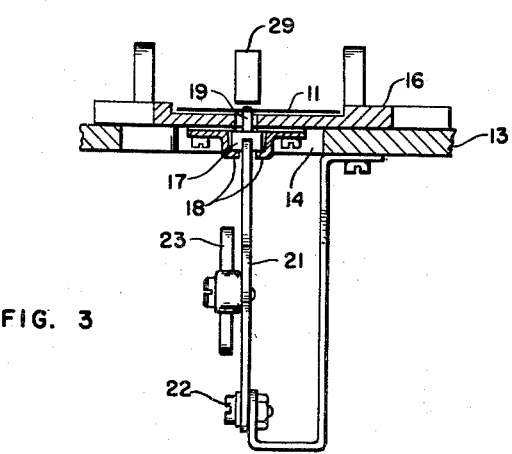
Fig. 3 is a sectional view of the present invention taken along the line 3—3 in Fig. 1.

Fig. 4 illustrates an alternative embodiment of the present invention wherein a group of individual magnets 29' are associated with the pins 32' which are spaced more than one feed hole apart.

Fig. 2 shows an enlarged view of the spacing pin block 17 which is made of a nonmagnetic material such as bronze. The spacing pins 19 are of a magnetic material and are formed with a cylindrical portion 32 having a diameter which conforms to that of the feed holes; a collar 33 having a diameter larger than that of the feed holes; and a square, or otherwise noncircular, portion 34 at its bottom end. The upper end of the pin 19 has a cam surface 36 formed by cutting the cylindrical portion 32 along a plane from the top of the cylinder to a point diametrically opposite that point which is lower by the amount of penetration of the pin into the tape. This camming surface 36 allows the pins to be cammed downward and insulated from the magnet by the tape as they are reciprocated after advancing the tape. The pin block 17 is a hollow rectangular structure of nonmagnetic material which has a series of holes in its face 37 the diameters of which are the same as the diameter of the feed holes in the tape. The lower face 38 has a series of apertures conforming to the portion 34 of the pin 19 in line with the apertures in the upper face 37 to receive the square portion 34 of the pin 19. The pins are inserted in the pin block with the high portion of the cam surface 36 toward the direction of travel of the tape. Through cooperation of the square portion 34 and the lower face 38 the pin is prevented from turning and the collar 33 set at a predetermined point on the pin, limits the movement of the pin 19 and prevents it from coming in contact with the magnet 29. While the present illustration is shown for circular feed holes, the pins may be modified to conform to any shape feed hole.

In operation the tape 11 is placed in the tape guide 16 so that its feed holes are directly over the pins 19. When the lid is put in place, the magnet 29 is placed in proximity of the pins which are attracted upward through the feed holes. The cam 23 is then rotated to oscillate cam follower 21 through a predetermined angle of oscillation. Oscillation of the cam follower 21 is transmitted into linear motion for the pin block 17 so that the tape is advanced a predetermined amount. It will be noted that one or more of the pins 19 is thereby moved out of the magnetic field of the magnet 29 and thus automatically disengages itself from the tape at the end of the forward stroke. As the cam 23 continues to rotate, the pin block 17 is reciprocated to its original position. During the reciprocating stroke, the tape 11 cooperates with the cam surface 36 of the pin 19 to disengage the pins from the tape and also insulates the pins from the magnet to further reduce the wearing force between the pins and the tape. When the follower arms 21 and 23 reach the position shown in Fig. 1, the pins 19 are in line with a new set of feed holes to repeat the tape advancing movement. The timing, of course, is such that the sensing means 31 senses the indicia in the tape during the reciprocating portion of the foregoing cycle.

Operation of the alternative embodiment is similar to that described in the preceding paragraph with the exception that a plurality of pins 32' can be used with the plurality of magnets 29' and the movement of one space moves each pin out of its individual magnetic field so that the pins 32' drop automatically out of engagement with the tape at the end of the forward movement of the pin block 17'.

While the present invention has been described in a specific embodiment, it is, of course, understood that varous modifications may be employed with the illustrated embodiment without departing from the spirit and scope of this invention.

What is claimed is:

1. In a telegraph transmitter, a tape advancing means comprising, a tape guiding means, a magnet positioned above said tape guiding means, a pin means adapted to be presented into the magnetic field of said magnet for advancing said tape, means for moving said pin means from a home position for advancing said tape, means for returning said pin means to its home position, and means actuated by the return movement for rendering said pin means ineffective for moving said tape.

2. An intermittent advancing means for a telegraphic tape having feed holes therein comprising, a tape guiding means, a magnet positioned above said tape guiding means, a plurality of feed pins positioned below said tape guiding means, said pins being adapted to be individually moved into said feed holes by said magnet, means for imparting reciprocal movement to said feed pins collectively, and means controlled by the return movement of said pins for moving said feed pins individually out of said feed holes.

3. In a telegraph transmitter, means for advancing a perforated tape comprising, a magnet means positioned above said tape, a pin means of magnetic material positioned below said tape, said pin means being adapted to be held in engagement with said tape by said magnet means while in the magnetic field, and reciprocating means for moving said pin means out of and into the magnetic field of said magnet means, whereby the tape is engaged by said pin means while in the magnetic field and automatically disengaged from said tape at the end of the movement which transmits said pin means outside the magnetic field.

4. In a telegraph transmitter, means for advancing a perforated tape which has regularly spaced feed holes therein, comprising, a pin block, a plurality of pins of magnetic material slidably positioned in said pin block at intervals corresponding to said feed holes, means for positioning said tape relative to said pins, a magnet positioned above said tape positioning means for attracting said pins through said feed holes, means for moving said pin block along the line of tape advance, means for returning said pin block to its original position, and means for disengaging said pins from said feed holes during the return movement of said pin block.

5. An intermittent advancing means for a telegraphic tape having regularly spaced feed holes therein comprising, a tape guiding means, a pin block having a plurality of apertures conforming to said feed holes regularly spaced therein, a plurality of pins of magnetic material conforming in cross section to said feed holes slidably positioned in said pin block, each of said pins having its end surface formed by a plane passed from a predetermined point on one side to a point diametrically opposite which a predetermined distance below said predetermined point, a magnet adapted to attract said pins up through said feed holes positioned above said tape guiding means, means for limiting the vertical movement of said pins, means for imparting reciprocal movement to said pin block, and means for holding the pins so that the high portions of the end plane of said pins are toward the direction of advance of said tape.

6. In a telegraph transmitter, a tape feeding device for advancing a tape having regularly spaced feed holes therein, a magnet, a tape guiding means positioned below said magnet, a first nonmagnetic plate having a plurality of apertures therein conforming to said feed holes positioned below said tape guiding means, a second nonmagnetic plate having a plurality of noncircular apertures therein, means for fixing said second plate parallel to said first plate with the geometric centers of the apertures of the two plates vertically aligned within the magnetic fiield of said magnet a predetermined distance below said first plate, means for imparting reciprocal motion to said first and second plates as a unit, a plurality of pins of a magnetic material having cam surfaces on one end thereof slidably positioned in the apertures in said first and second plate, said pins being formed so that a first and second predetermined portion conforms in cross section to the apertures in said first plate and said second plate respectively, whereby the cam portion of the pins is held in a predetermined position as the pins are moved upward by said magnet so as to cooperate with said tape during the return movement of said plates to cam the pins out of engagement with said feed holes.

7. In a telegraph transmitter, a tape feeding device for advancing a tape having regularly spaced circular feed holes therein comprising, a magnet, a tape guiding means positioned below said magnet, a first nonmagnetic plate having a plurality of apertures therein conforming to said feed holes positioned below said tape guide, a second nonmagnetic plate having a pluraliy of noncircular apertures therein, means for fixing said second plate parallel to said first plate with the diametric centers of the apertures in the two plates vertically aligned a predetermined distance below said first plate, means for imparting reciprocal motion to said first and second plate as a unit, a plurality of pins of magnetic material having cam surfaces on one end thereof slidably positioned in said first and second plate, said pins being adapted to be moved into said feed holes by said magnet, and said pins being formed with a cylindrical portion and a noncylindrical portion conforming in cross section to the apertures in said first and second plate respectively, whereby the camming surface of the pins is held in a predetermined position to cooperate with said tape during the return movement of said plates to cam the pins out of engagement with said feed holes.

8. A device for advancing a perforated record comprising a record guiding means, a pin block positioned below said guide means, a plurality of pins of magnetic material slidably positioned at predetermined intervals in said pin block, a plurality of magnets positioned at predetermined intervals above said guide means for attracting said pins individually through the perforations in the record, and reciprocating means for moving said pins out of control of said magnets, whereby said pins advance said record a predetermined amount and are moved out of the magnetic fields so as to automatically drop out of engagement with said record at the end of said advancement.

References Cited in the file of this patent

UNITED STATES PATENTS

| | | |
|---|---|---|
| 1,343,648 | Smith | June 15, 1920 |
| 2,001,520 | Carlson | May 14, 1935 |
| 2,639,148 | Adams | May 19, 1953 |